April 14, 1931. G. O. JOHNSON 1,800,888
JUVENILE VEHICLE CONSTRUCTION
Filed May 21, 1930
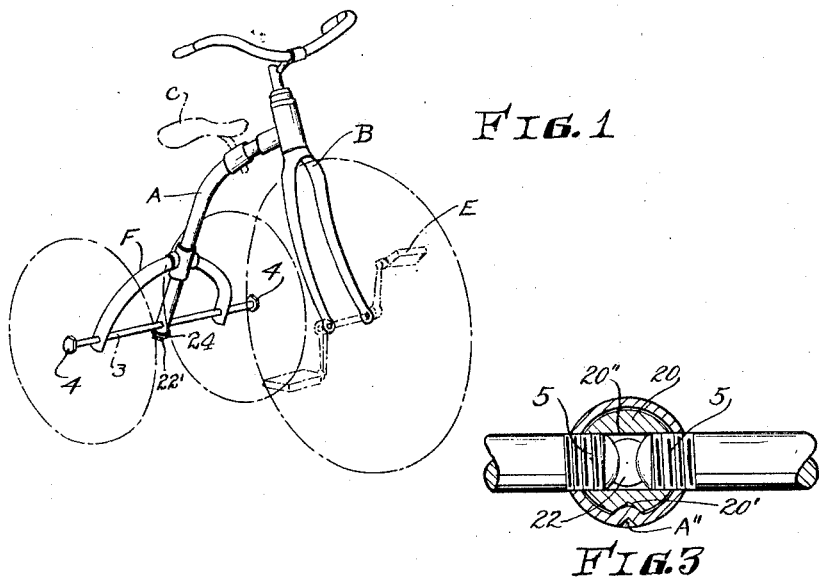
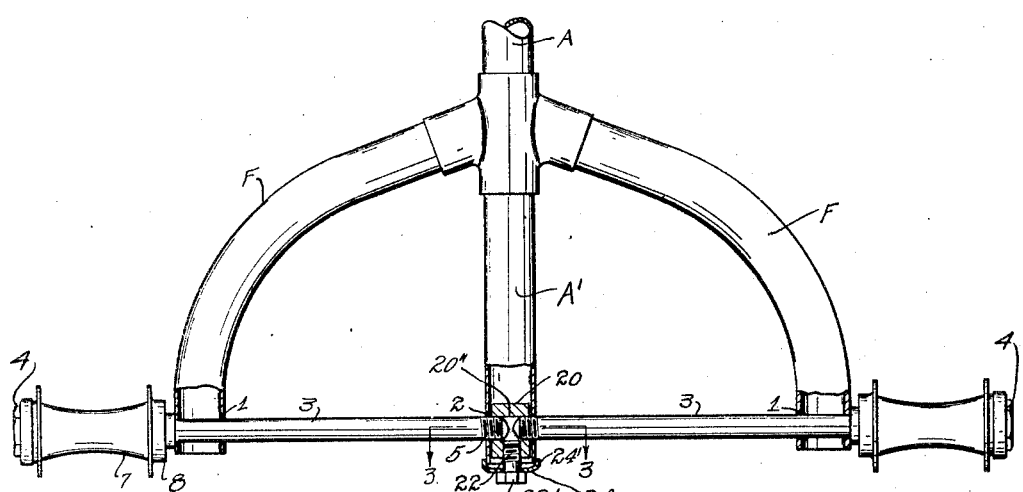
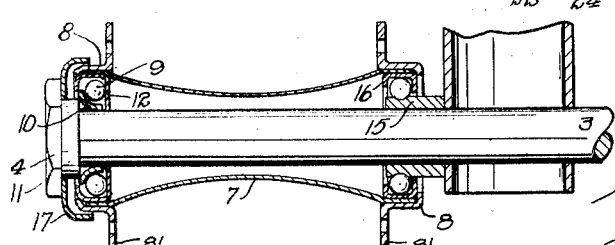
Inventor
Gustaf O. Johnson
By Bates, Gohrick & Teare
Attorneys Patented Apr. 14, 1931

1,800,888

UNITED STATES PATENT OFFICE

GUSTAF O. JOHNSON, OF ELKHART, INDIANA, ASSIGNOR TO MURRAY-OHIO MANUFACTURING COMPANY, OF CLEVELAND, OHIO, A CORPORATION OF OHIO

JUVENILE VEHICLE CONSTRUCTION

Application filed May 21, 1930. Serial No. 454,277.

This invention relates particularly to a tricycle construction, but the invention is applicable to juvenile vehicles of various other types.

The primary object is to provide an axle construction which will permit the wheels and portions of the axles to be removed for more convenient and inexpensive packing and shipment of the vehicle, yet which will not complicate reassembly.

Another object is to provide an axle construction for a juvenile vehicle by which the wheels and associated parts are effectively maintained in the desired operating relationship.

Still another object is to provide a simple and effective bearing adjustment or takeup device in connection with removable axle members of a juvenile vehicle.

Other objects and features of the invention will become apparent from the following description relating to the accompanying drawing, showing the preferred form. The essential characteristics will be summarized in the claims.

In the drawing, Fig. 1 is a perspective view showing a conventional form of tricycle construction with which the invention is particularly adapted to be used; Fig. 2 is a central longitudinal sectional view through the axles and supporting parts of the frame, the rear portions only of the frame being shown; Fig. 3 is a detail cross sectional view taken substantially along the line 3—3 on Fig. 2, and Fig. 4 is a longitudinal cross sectional view of one of the wheel hubs and associated parts.

In the construction of juvenile vehicles of the type herein referred to, the usual axle arrangement for the non-traction wheels is to provide a dead axle extending from one side of the vehicle to the other and on which the wheels are adapted to turn freely, and be secured by removable nuts, cotter pins or the like. One disadvantage of this type of construction is that the axle is not readily removable, particularly where it provides shoulders for the wheels and bearing race supports, and therefore, the common practice, for packing and shipment, is to leave the axles in place on the frame or body, removing, or leaving off, only the wheels. However, the projecting axles still require considerable packing space, and one phase of the invention is to provide for further reducing the packing space by making the axles easily removable, and/or capable of easy assembly, whereby the ultimate user will experience practically no difficulty in properly assembling the parts on the vehicle.

Another problem heretofore presented in constructions of this kind is the provision of suitable hub caps for juvenile vehicles. The axles are not usually adapted to support the type of hub cap such as used on larger vehicles, and, usually, rather flimsy caps have been made for attachment to the spokes of the wheel, for example, or in case of disc wheels to lugs or openings thereon. Such caps come off easily. With the present arrangement, the cap is very securely held in place, as will be presently shown, without requiring threads or, in fact, any special fastening means.

Still another problem presented by juvenile vehicle constructions and not heretofore completely overcome is adjustment of wheel bearings, particularly for end thrust to prevent side play and wabbling of the wheels. With the present arrangement, the axles may be effectively locked in the desired position with substantially all the end thrust taken up.

Referring in detail to the drawings, and first to Fig. 1, A is the main frame of a tricycle having attached thereto, in any suitable manner, a front wheel and steering gear supporting fork B, and a seat structure C. Suitable means for driving the vehicle may comprise pedal cranks shown at E. Near the rear end of the member A, this has downwardly and laterally extending arms F, the arms extending on opposite sides of a central extension A' of the frame member A.

The arms F and frame A may be tubular in construction, as shown, and have registering apertures at 1 and 2 respectively, for supporting the axle. Threaded through the apertures 1 of each arm F are axle members 3 in the nature of bolts, each having enlarged heads 4 at one end and threaded portions 5 at the other. The outer end portions of the axles, that is, the portions between the heads and the respective arms F, carry the wheels, which latter may be of any suitable construction. As shown, (see Fig. 4) each wheel may comprise a central tubular hub 7 and members 8 having spoke attachment flanges 8' to which, it may be assumed, the conventional type of wire spokes may be fastened.

Since, as shown, the enlarged head 4 is to retain the wheel in place, it is desirable that a bearing arrangement be provided near this head for taking both radial and end thrust. Such a bearing is indicated at 9 and may comprise a series of balls resting inwardly against a pressed metal race member 10 on a supporting head formation 11, preferably integral with the axle. The outer race for the balls may be formed by a channel-shaped race member 12 embracing the balls and co-operating with the race 10 to form a retaining cage for the balls. The bearing assembly, including the members 10 and 12, and the balls may be pressed into the end of the hub member 7 where it will be retained by the press fit. A similar bearing arrangement for each wheel may be provided adjacent the arms F by reason of inner races 15, outer channeled races 16 and interposed balls. Both inner race members, preferably slip over the axle 3 loosely for assembly, so that all the bearing parts may be retained with the wheel at all times prior to assembly.

It is obviously desirable to protect the bearings against the entrance of dirt and to retain grease, and for this there is provided a hub cap 17 in partially embracing relation to the member 8 and retained in place by the head 4.

The device for holding the two axle members 3 in fixed position with relation to each other, and with the axle heads 4 in the proper position to keep the bearings in comparatively tight but free running condition, comprises, in part, a nut member 20 which may be made to slide loosely into the outer end of the tubular frame extension A' and which may be maintained in approximately the position shown, by forming a slight inward protuberance, A" (see Fig. 3) in the wall of the frame extension A', as with a prick-punch, the protuberance entering a depression 20' formed in the member 20. The nut member 20 has a through opening 20" threaded to receive the threaded ends 5 of the axles. The axles, as shown, come close to each other, but do not touch, and therefore, would normally be easily removed from the nut member 20. To lock both axles in place in nicely adjusted position, I provide a device for gripping or clamping the inner ends of the axle sections together, after the sections are properly adjusted. This device may be considerably modified, in practice, but as shown it comprises a screw 22, having its inner end threaded into the nut member 20. The screw has a head at 22' and the head abuts a sheet metal closure member 24 for the end of the extension A', this member having a continuous flange portion 24' embracing the lower end of the frame extensions A'.

It will be seen that when the two axles are properly adjusted, as by turning the heads 4 with a suitable wrench, to take up the bearing play at the wheels, the screw 22 may be tightly locked against the closure member 24, thus drawing the nut member 20 downwardly and binding both axle sections 3, at the threaded portions as well as at the openings 2. It will be further seen that by the specific arrangement shown, the threads on the axle sections and in the nut member are in no way deformed, wherefore the subsequent removal and replacement of the axle sections is not interfered with. Other advantages of the arrangement will be obvious from the foregoing description.

I claim:—

1. In a juvenile vehicle, a pair of wheels, a frame, individual axles for the wheels removably carried by the frame, said axles being arranged to retain the wheels thereon, a nut carried by the frame in non-rotative and laterally fixed position, both said axles being threaded at their inner ends to engage the nut, and means associated with the nut to lock the axles against relative turning movement.

2. In a velocipede, a central tubular frame member, side frame members rigidly connected therewith and laterally spaced from the central member, registering openings in all said members, a shaft comprising two sections supported by respective openings, an internally threaded nut carried in the tubular member, the adjacent ends of the said sections being adapted to be threaded into the nut from opposite directions, and a locking device associated with the nut, arranged to hold the sections in various relatively adjusted positions and against relative turning movement, there being wheels carried by respective said sections on opposite sides of the frame.

3. In a juvenile vehicle, a pair of substantially aligned dead axles having enlargements at their outer ends, a frame removably supporting the axles, wheels carried by said axles between the frame and respective enlargements, bearings for the wheels, and means carried by the frame and associated with the inner ends of the axles, arranged to provide for individual longitudinal adjustment of the axles, there being means associated with the last named means to lock the axles in adjusted position with the end thrust on the bearings taken up.

4. In a juvenile vehicle, a frame, including a central tubular member, an axle shaft for supporting a pair of wheels, said shaft including two sections, there being openings in opposite sides of the tubular member, permitting the insertion of the sections, a nut within the tubular member, threaded to receive the adjacent ends of said sections, said sections being threaded, a screw operatively engaging the nut for drawing the latter in a direction normal to the axes of the sections to lock the latter, and a closure device for the tubular member through which the screw extends, the screw having a shoulder abutting the closure device on the surface thereof opposite the nut, whereby the action of the screw holds all the aforesaid parts in rigid relationship.

5. In a juvenile vehicle, a front fork member, a front wheel journalled in said fork member, a main integral frame member associated with the front fork member, said frame member having a pair of depending arms integral therewith at the rear end thereof, a pair of rear wheels, a rear axle including two sections, one for each wheel, each axle being removably supported in a horizontal position by passing through one depending arm and into said main frame member, and means associated with the main integral frame member to lock the axles in substantially fixed relation to each other.

6. In a velocipede, a front fork member, a wheel journalled in said fork member, a longitudinal main frame member integral throughout and associated at one end with said fork member, said longitudinal frame member having a pair of depending arms at the end opposite the fork member, said longitudinal main frame member and depending arms forming a support for two substantially aligned axle shafts, a pair of rear wheels journalled on said axle shafts, and means associated with the longitudinal main frame member for releasably locking the adjacent ends of said axles together, whereby the axle and wheels may be removed for packing and shipment and easily replaced for use on the vehicle.

In testimony whereof, I hereunto affix my signature.

GUSTAF O. JOHNSON.